(12) United States Patent
Giffin et al.

(10) Patent No.: US 8,622,687 B2
(45) Date of Patent: Jan. 7, 2014

(54) METHOD OF OPERATING ADAPTIVE CORE ENGINES

(75) Inventors: Rollin George Giffin, Cincinnati, OH (US); Brandon Flowers Powell, Cincinnati, OH (US); Mark Harrington, Cincinnati, OH (US); James Edward Johnson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 547 days.

(21) Appl. No.: 12/871,073

(22) Filed: Aug. 30, 2010

(65) Prior Publication Data

US 2011/0076158 A1    Mar. 31, 2011

Related U.S. Application Data

(60) Provisional application No. 61/246,078, filed on Sep. 25, 2009, provisional application No. 61/247,752, filed on Oct. 1, 2009.

(51) Int. Cl.
*F02K 3/00*    (2006.01)

(52) U.S. Cl.
USPC ................................ 415/1; 60/39.23; 60/726

(58) Field of Classification Search
USPC .......................................... 415/152.1, 167.1
See application file for complete search history.

(56) References Cited

U.S. PATENT DOCUMENTS

| | | | |
|---|---|---|---|
| 3,296,800 A | 1/1967 | Keenan et al. | |
| 4,010,608 A * | 3/1977 | Simmons | 60/226.3 |
| 4,080,785 A | 3/1978 | Budinger et al. | |
| 4,261,686 A * | 4/1981 | Weiler | 415/151 |
| 5,623,823 A | 4/1997 | Schirle et al. | |
| 5,809,772 A | 9/1998 | Giffin, III et al. | |
| 7,140,174 B2 | 11/2006 | Johnson | |
| 2005/0019156 A1* | 1/2005 | D'Angelo et al. | 415/144 |
| 2008/0141676 A1* | 6/2008 | Johnson | 60/785 |
| 2008/0155961 A1* | 7/2008 | Johnson | 60/226.3 |

OTHER PUBLICATIONS

PCT/US2010/50149, Search Report and Written Opinion, Dec. 21, 2010.

* cited by examiner

*Primary Examiner* — Nathaniel Wiehe
*Assistant Examiner* — Jeffrey A Brownson
(74) *Attorney, Agent, or Firm* — General Electric Company; Steven J. Rosen (57) ABSTRACT

A method of operating a compressor in an adaptive core engine is disclosed. The method comprises the steps of operating a front block compressor to increase pressure of a fluid to a first pressure ratio in a high-power mode operation; operating a rear block compressor coupled to the front block compressor such that the front block compressor and the rear block compressor operate at the same physical speed; closing a rear block stator vane located axially forward from the rear block compressor such that the flow of the fluid into the rear block compressor is substantially cut off; and keeping a blocker door opened such that substantially all of the fluid pressurized by the front block compressor flows through a bypass passage during the high-power mode operation. The operation may be transitioned from the high-power mode to a low-power mode by opening a rear block stator such that the rear block compressor receives at least a portion of the fluid flowing from the front block compressor and maintains an overall engine pressure ratio.

13 Claims, 5 Drawing Sheets

METHOD OF OPERATING ADAPTIVE CORE ENGINES

CROSS-REFERENCE TO RELATED APPLICATIONS

This application claims priority to U.S. Provisional Application Ser. No. 61/246,078, filed Sep. 25, 2009, and U.S. Provisional Application Ser. No. 61/247,752, filed Oct. 1, 2009, which are herein incorporated by reference in their entirety.

BACKGROUND OF THE INVENTION

This invention relates generally to jet propulsion engines, and more specifically to adaptive core engines and methods of operating them under variable flow conditions while maintaining near constant overall pressure ratio.

Future mixed mission morphing aircraft as well as more conventional mixed mission capable military systems that have a high value of thrust/weight ratio present many challenges to the propulsion system. They need efficient propulsion operation at diverse flight speeds, altitudes, and particularly at low power settings where conventional engine designs may have reduced part-power efficiency.

When defining a conventional engine cycle and configuration for a mixed mission application, compromises have to be made in the selection of fan pressure ratio, bypass ratio, and overall pressure ratio to allow an engine to operate effectively at both subsonic and supersonic flight conditions. In particular, the fan pressure ratio and related bypass ratio selection needed to obtain an engine capable of developing the thrusts needed for combat maneuvers and supersonic operation are non-optimum for efficient low power subsonic flight where conventional design engines cannot retain the high overall pressure ratio.

In the art, the core concepts studied in multi-core engines are quite complex, having multiple cores with multiple compressors. The transition of operation between these multiple compressors would require the use of complex diverter ducts and valves. Further, the engines may be required to operate at any operating point during transitions from the high-power mode to the low-power mode or vice-versa. Further, operation of the engine near or at minimum SFC (Specific Fuel Consumption) levels is desirable at any intermediate point. It is desirable that the engine should not be operated at an overall pressure ratio higher than that of the high-power mode because of cooling air restrictions on compressor exit temperature.

Accordingly, it would be desirable to have an adaptive core engine having a simple core design having the variable flow-near constant pressure ratio operating capability while retaining more traditional framing, sealing, and bearing designs. It would be desirable to have a method of operating multiple compressor blocks in an adaptive core engine whereby the adaptive core engine transitions between high power mode and a low power mode and substantially maintains an overall high pressure ratio in both modes without creating reverse flows in bypass ducts.

BRIEF DESCRIPTION OF THE INVENTION

The above-mentioned need or needs may be met by exemplary embodiments disclosed herein which provide a method of operating a compressor in an adaptive core engine comprising the steps of operating a front block compressor to increase pressure of a fluid to a first pressure ratio in a high-power mode operation; operating a rear block compressor coupled to the front block compressor such that the front block compressor and the rear block compressor operate at the same physical speed; closing a rear block stator vane such that the flow of the fluid into the rear block compressor is substantially cut off; and keeping a blocker door opened such that substantially all of the fluid pressurized by the front block compressor flows thorough a bypass passage during the high-power mode operation. The adaptive core engine operation may be transitioned from the high-power mode to a low-power mode such that the rear block compressor receives at least a portion of the fluid flowing from the front block compressor and maintains an overall engine pressure ratio.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
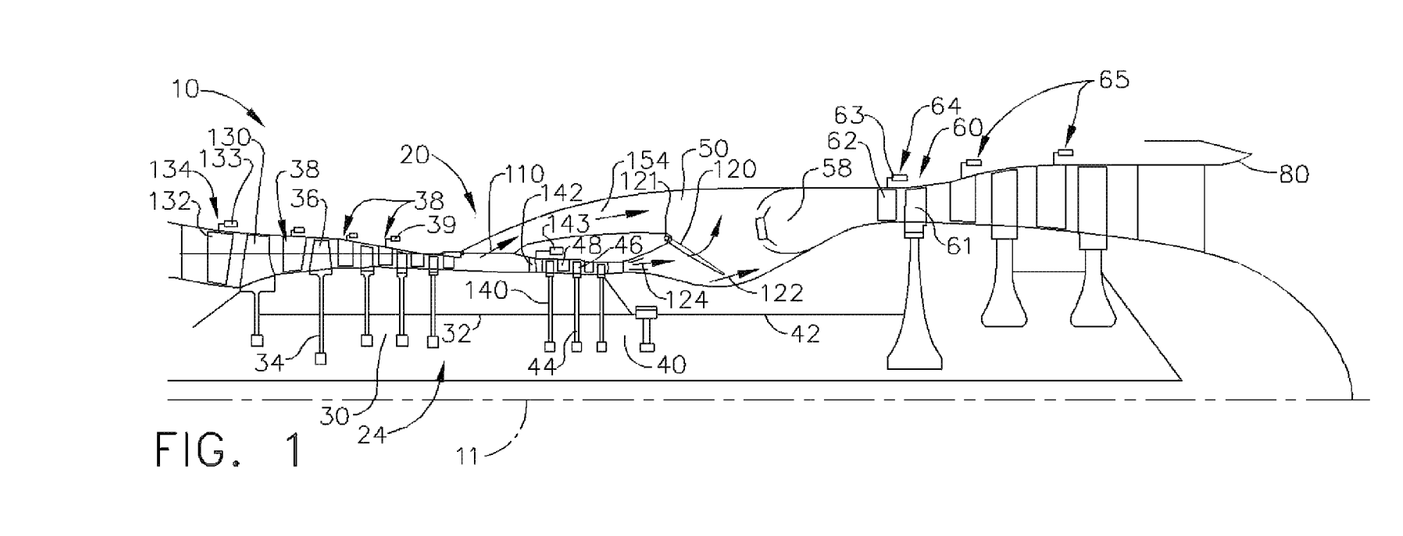
FIG. 1 is a schematic cross-sectional view of a portion of an adaptive core gas turbine engine constructed according to an aspect of the present invention.

Referring to the drawings wherein identical reference numerals denote the same elements throughout the various views, FIG. 1 is a schematic cross-sectional view of a portion of an adaptive core gas turbine engine constructed according to an aspect of the present invention. The exemplary adaptive core gas turbine engine 10 shown in FIG. 1 comprises an adaptive core 20 having a front block compressor 30 and a rear block compressor 40. The front block compressor 30 comprises one or more compressor stages, each stage having a row of blades 36 arranged circumferentially around an engine centerline axis 11. The row of blades 36 is suitably supported by a disk 34 or spool. A row of vanes 38 is located axially forward from the row of rotor blades 36. A row of vanes 134, often referred to as Inlet Guide vanes (IGV) 132 is located axially forward from the first rotor stage 130 of the front block compressor 30. The IGV 132 of the front block compressor 30 is a variable type, as shown schematically in FIG. 1. Other stator vanes 38 of the front block compressor 30 may also be variable stators, as shown schematically in FIG. 1. Variable stators allow variations in the basic flow of air and its direction through the compressor stages, such as, for example, for stage matching during off-design operation. The inlet guide vanes (IGV) 132 may have their stagger (setting angle) selectively changed by using an actuator 133. Suitable, known actuators can be used for this purpose. Optionally, some of the inter-stage vanes 38 may have their stagger (setting angle) changed by using an actuator 39. Here again, suitable, known actuators can be used for this purpose.

The adaptive core 20 shown schematically in FIG. 1 comprises a rear block compressor 40. In the exemplary embodiment shown in FIG. 1, the rear block compressor 40 is an axial compressor comprising of one or more stages, each stage having a row of blades 46 arranged circumferentially around the engine center line axis 11. The row of blades is suitably supported by a disk or spool 44. A row of vanes 48 is located axially forward from the row of rotor blades 46. A row of vanes, often referred to as rear block Inlet Guide vanes (IGV) 142 is located axially forward from the first rotor stage 140 of the rear block compressor 40. The rear block IGV 142 of the rear block compressor 40 is a variable type, as shown schematically in FIG. 1. Other stator vanes of the rear block compressor 40 may also be variable stators (not shown in FIG. 1). Variable stators allow stagger angle variations (to effect variations in the basic flow of air and its direction) in the compressor stages. In the rear block compressor 40, the inlet guide vanes (IGV) may have their angle of attack with respect to the airflow and their open flow area selectively changed by using a known actuator 143. Optionally, the interstage vanes may have their stagger angle selectively changed by using an actuator of a known type (not shown in FIG. 1). During operation, it is possible to move at least a portion of the rear block IGV 142 using the actuator 143 such that the flow of air into the rear block compressor 40 may be substantially blocked, except for some purge air flow (item 122 for example). The rear block 40 is "stowable" in that it is capable of being substantially fully closed using the IGV system 142 and actuator 143 to prevent airflow through it, except for a purge flow 122. In the exemplary embodiment shown in FIG. 1, the front block compressor 30 and the rear block compressor 40 are driven by a high pressure turbine 60 that is coupled to a turbine shaft 42 that in turn is coupled to a compressor shaft.

Although FIG. 1 shows an axial flow compressor for the rear block compressor 40, in alternative embodiments of the present invention, the rear block compressor may be a centrifugal compressor or an axi-centrifugal compressor. The principles and methods of operation of the adaptive core described herein (and shown in FIG. 1) are applicable for these alternative embodiments.

The adaptive core engine described herein has a core compressor 24 that comprises an axially forward block (front block) compressor 30 and a rear block compressor 40. A high-power mode is characterized by the forward block 30 of the core compressor 24 pressurizing the flow with the rear block 40 operating in a substantially closed manner. A low-power mode is characterized by the front block 30 operating well below its maximum potential but with the rear block 40 operating at its maximum potential. In the mode where the rear block 40 is phased out of operation the engine performance is substantially similar to that of a conventional turbofan engine. The operational mode switch occurs when the rear block 40 is brought on line to make up for the deficiency in overall pressure ratio that has been experienced by the drop in front block 30 pressure ratio due to its operation at part power. Once mode change has been accomplished by bringing the rear block 40 on line, further reductions in engine thrust may be accomplished by further migration along the operating line of the front block 30 with a suitable scheduled operating line migration on the rear block 40. During certain modes of operation, such as, for example, a low-power mode, the pressure behind the rear block compressor 40 is substantially higher than the pressure in front of the rear block compressor, creating a mechanism for a potential reverse flow. A bypass door 150 is used to prevent such a reverse flow in the bypass passage 154.

As to the amount of flow into the rear block compressor 40, the mechanisms for controlling that flow include the rear block compressor corrected speed and the setting (stagger) of the variable stators 142, 48 in the rear block 40. At constant physical HP (high pressure) compressor shaft (see item 32 in FIG. 1) speed, the corrected speed of the rear block 40 increases as the flow into the front block 30 and the front block pressure ratio decrease. This is because the temperature rise across the front block compressor 30 reduces with reduced front block pressure ratio. The lower temperature into the rear block, with a constant physical speed, raises the rear block 40 corrected speed. Transition between high-power mode and low-power mode is facilitated by the variable vanes (see items 132, 38 in FIG. 1) for the front block 30 and variable vanes (see items 142, 48 in FIG. 1) for rear block 40 compressors. In some cases, the front block stators track a schedule in preparation for the transition, and once this preparation has been completed, transition of the core compressor modes may be accomplished without further change to the front block stators.

An exemplary transitional operation of the engine 10 may be described as follows, assuming the transition of the fan from a single bypass to a double bypass has already been accomplished. Beginning with the high-power mode of the core compressor 24 as the starting point, the core compressor 24 is presumed to be operating at a reduced core exit temperature and reduced speed (because the transition to double bypass of fan has already been accomplished). The core is, however, still in the high-power mode. This means that the rear block compressor 40 remains "phased" out of the operating loop by virtue of having its inlet guide vanes 142 fully closed during the high-power mode. The bypass door 150 is fully open and stays that way initially, as in the high-power mode. The rear block stators 142, 48 are then opened and flow into the rear block 40 initiates. The flow into the rear block 40 satisfies continuity by a combination of "stealing" flow from the bypass duct and dropping or raising the operating line of the front block compressor 30 if necessary. The flow function downstream of the core compressor 24 is held to remain substantially constant during this portion of the transition, and that approximately preserves the overall pressure ratio of the engine. It may be noted that, at this point, the bypass door 150 is still wide open and adjustments to the front block 30 operating line can be accomplished to approximately preserve the overall pressure ratio of the engine. At this point during the transition, the operating pressure ratio of the rear block 40 is approximately 1.0 because it has not been throttled up from its starting point in the high-power mode but in low-power operating condition. At this point during the transition the discharge pressure from the rear block 40 approximately equals that of the front block 30 and the stators 142, 48 of the rear block 40 have been opened to absorb all the flow coming from the front block 30. Accordingly, there is no net flow in the bypass duct 154 and the bypass door 150 can safely be closed without impacting the engine operation. The downstream flow function is then reduced to raise the operating line of the rear block 40 to regain the overall pressure ratio of the engine 10. The downstream flow function variation may be accomplished by operation of the variable high-pressure turbine nozzle 64, variable low-pressure turbine nozzle 65, and/or the exhaust nozzle 80. The engine is now in the low-power mode of operation at its full design overall pressure ratio.

Figure 2:
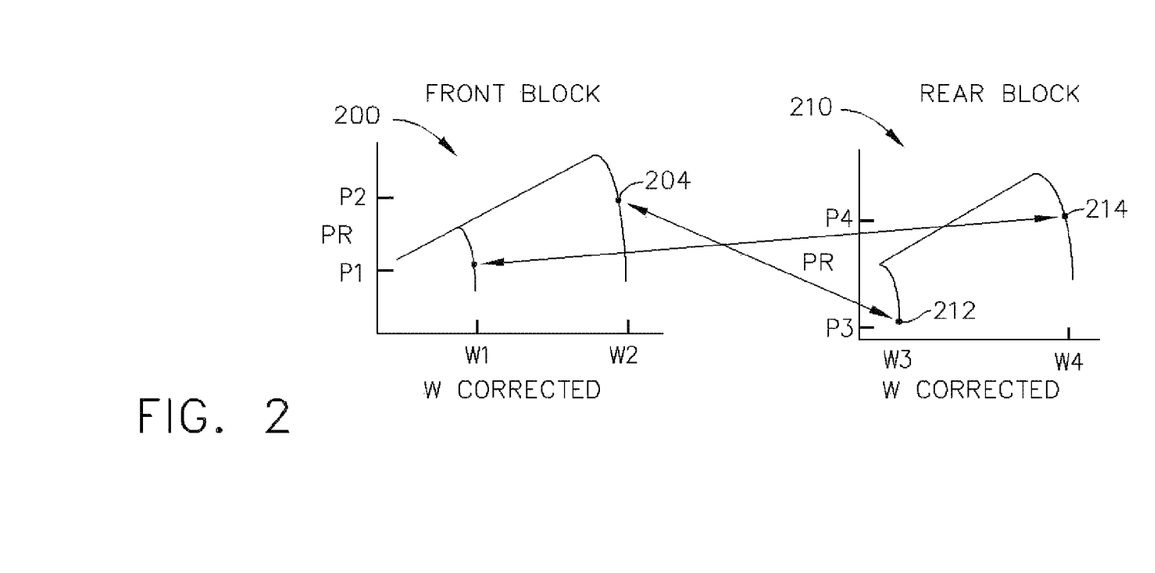
FIG. 2 is an example of compressor maps of front block compressor and rear block compressor during operation of the exemplary adaptive core gas turbine engine shown in FIG. 1.

During operation of the adaptive core engines, such as for example shown in the figures herein, at the maximum flow operation condition, the front block compressor 30 (see FIG. 1) is operated at design speed and pressure ratio. This is schematically shown in FIG. 2 (see item 200). FIG. 2 shows exemplary compressor maps 200, 210 of front block compressor 30 and rear block compressor 40 respectively during operation of the exemplary adaptive core gas turbine engine, such as, for example, shown in FIG. 1. Referring to FIG. 2, for this example the front block pressure ratio ("PR") is set at a value of P2 (8.5 for example), and the reference compressor flow rate ("W2") is at about 100% (see item 204, FIG. 2). The rear block IGV 142 is substantially closed (see item 212, FIG. 2) with only a controlled purge flow 122 passing through this section of the rear block compressor 40.

In this mode of operation (i.e., maximum flow condition) the majority of the front block compressor flow 110 goes around the rear block compressor 40 through a bypass passage 154 before entering the combustor 58. In some applications, a controlled area (variable area) diffuser may be optionally used, such as, for example, shown in FIG. 1. The optional variable area diffuser shown in FIG. 1 comprises a baffle 120 that is operable around a hinge 121 to control the diffusion of the flow from the compressors 30, 40. The adaptive core engine comprises a high-pressure turbine (HPT) 60. The HPT comprises HPT vanes 62 that are located axially forward from the HP turbine blades 61. The HPT vanes 62 (alternatively referred to herein as nozzles) may be a variable area type (VATN), such as, for example, shown in FIG. 1. Using the variable HPT vane 62, the flow geometry and flow function may be varied using known actuators 63 during operation of the engine 10. Alternatively, other known means of changing flow functions may also be used. In the exemplary embodiment shown in FIG. 1 and the operation described in FIG. 2, the HP turbine vanes are in their full open position during the maximum compressor flow operation. For reduced thrust, the front block flow is reduced by partially closing IGV 132 and other front block compressor variable stators 38 with a minimum amount of rotor speed (rpm) reduction. This combination keeps the rear block compressor 40 speed high for maximizing its pressure ratio potential during reduced flow operation of the front block compressor 30. Also, to help produce a high pressure ratio in the rear block compressor 40, the rear block compressor 40 design corrected speed is based on the super-charging temperature of the front block compressor discharge when the front block compressor is operated at a reduced pressure ratio level. In the exemplary method of operating shown in FIG. 2, the front block compressor 30 is at pressure ratio of "P1" (4.7 for example) at an operating corrected flow of "W1"% (60% for example). With a rear block compressor 40 design pressure ratio of "P4" (1.8 for example), and it's IGV 142 substantially fully open (see item 214, FIG. 2), the front block compressor flow now goes through the rear block compressor (see item 124 in FIG. 1) producing an overall core pressure ratio of close to "P2" (4.7×1.7=8.5 in the example) at a corrected flow of "W1" (60% in the example). The variable HPT vanes 62 may partially close for this operating mode of having substantially constant pressure ratio while having variable flow.

Figure 3:
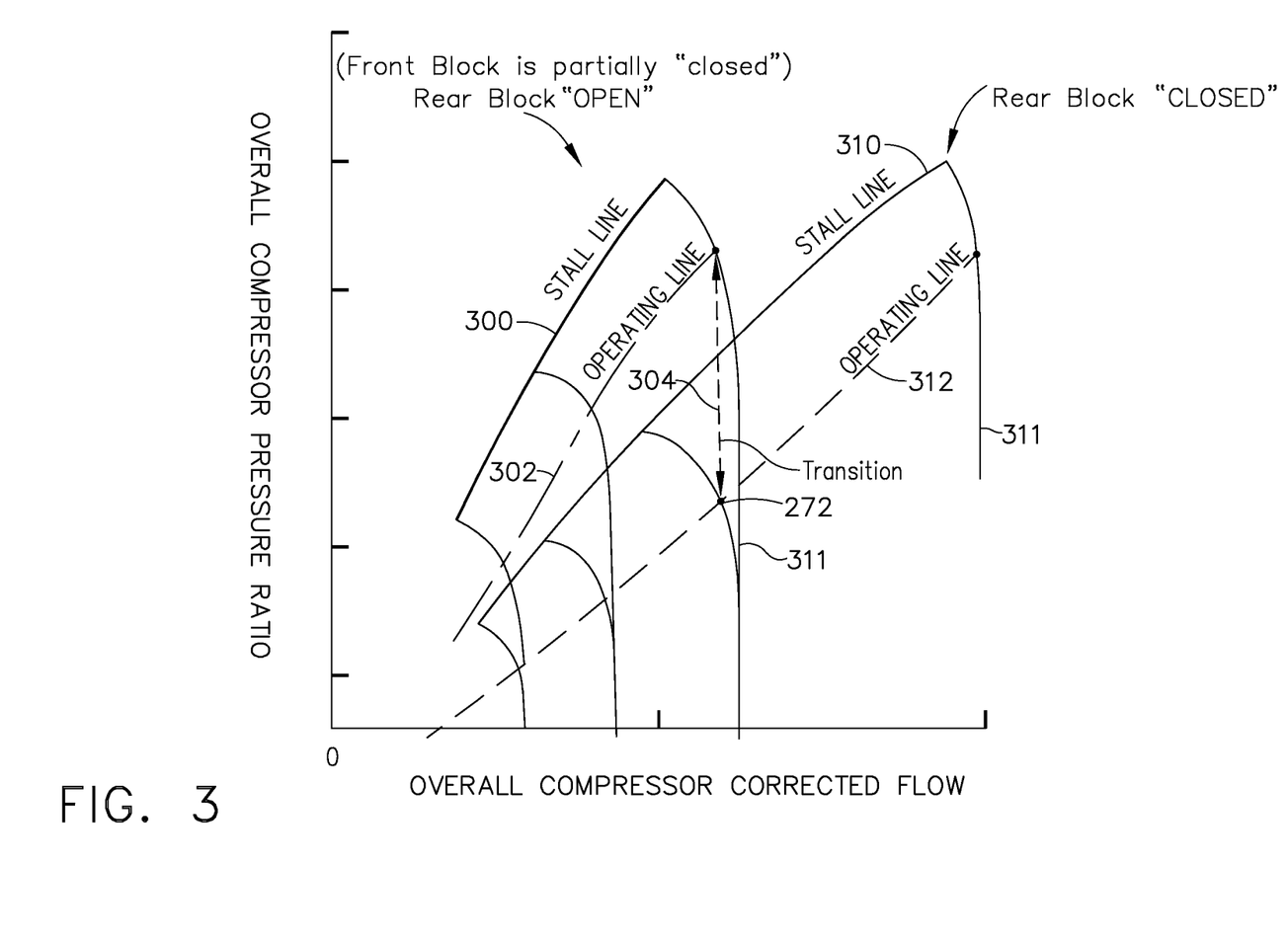
FIG. 3 is an example of the overall compressor operating characteristics of the exemplary adaptive core gas turbine engine shown in FIG. 1 showing two modes of operation and transition between the two modes.

FIG. 3 shows an example of the operating characteristics of the exemplary adaptive core 20 compressor in the exemplary adaptive core gas turbine engine 10 shown in FIG. 1. FIG. 3 shows the operating map with the overall compressor flow along the X-axis and the overall pressure ratio along the Y-axis. FIG. 3 illustrates the unique type of compressor map/operation that results from a two-block core compression system shown in the exemplary embodiments shown herein. FIG. 3 shows the compressor characteristics in two modes, one mode with the Rear Block compressor 40 "open" (having the Front Block compressor 30 partially closed and the other mode with the Rear Block compressor 40 "closed" (with the Front Block 30 nominal). The operating lines 302, 312 and stall lines 300, 310 shift as shown in FIG. 3, having transition lines 304 shown for example. The constant speed lines (see item 311 for example) are substantially the same speed, but having differing stator schedules.

Figure 4:
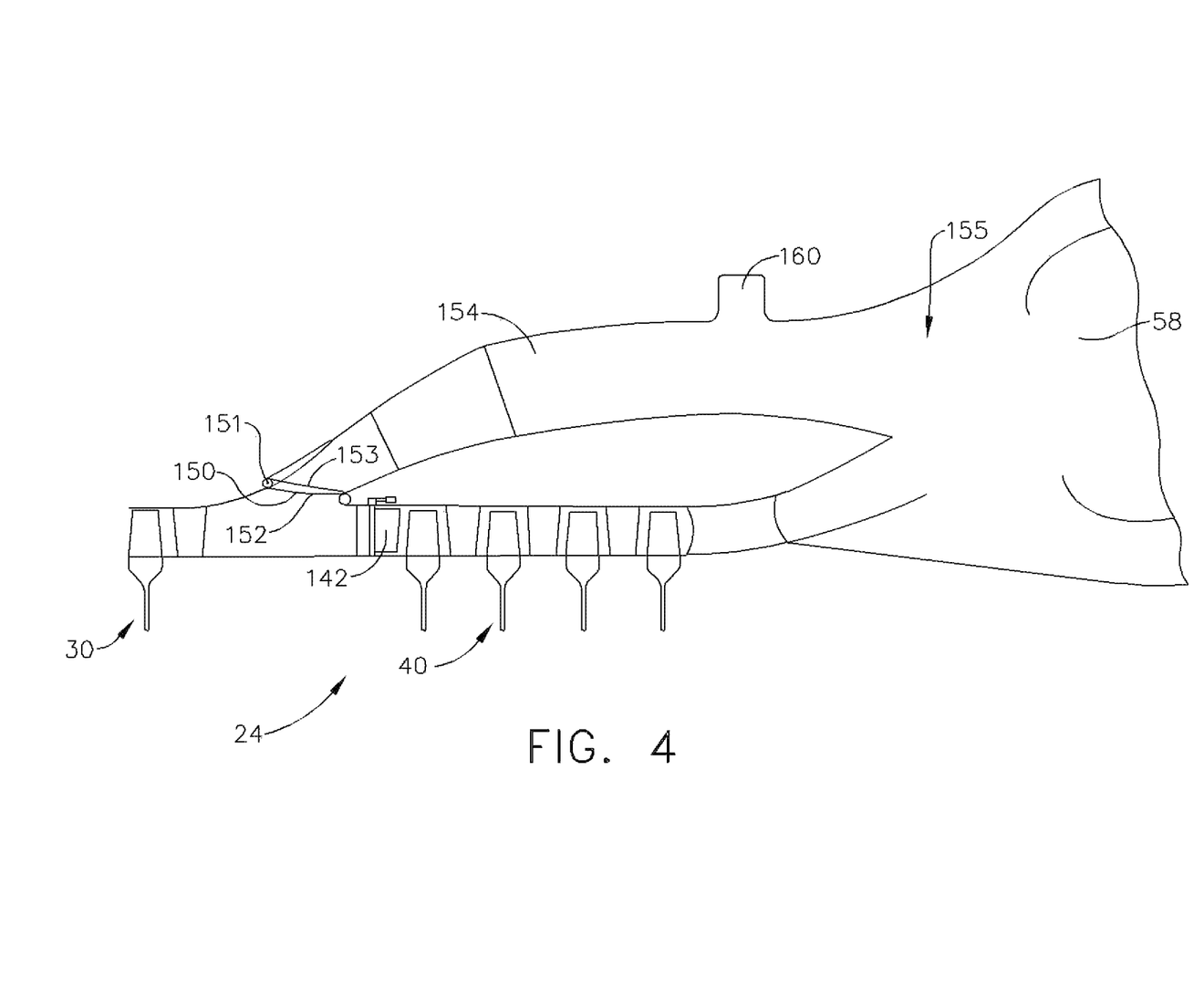
FIG. 4 is a schematic cross-sectional view of a portion of the core compressor of an embodiment of an adaptive core engine having a blocker door.
Figure 5:
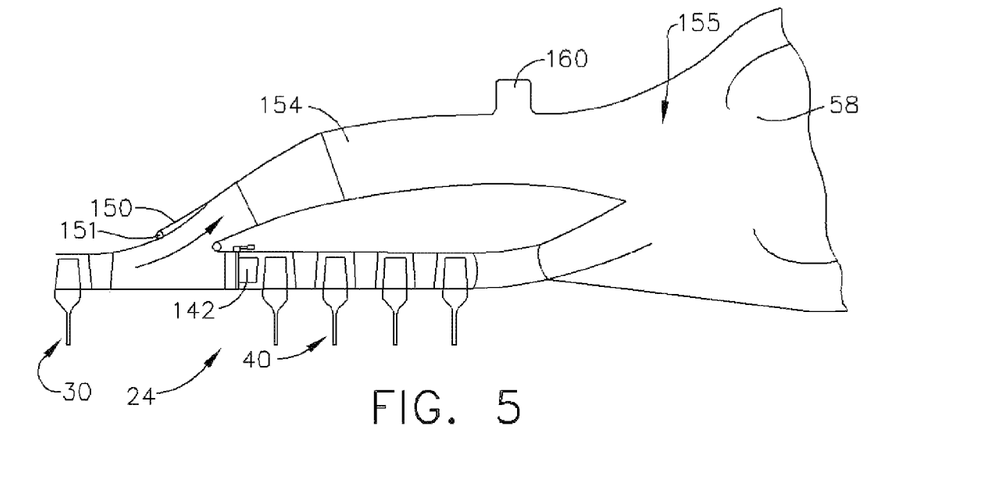
FIG. 5 is a schematic cross-sectional view of the compressor shown in FIG. 4 with a blocker door open.
Figure 6:
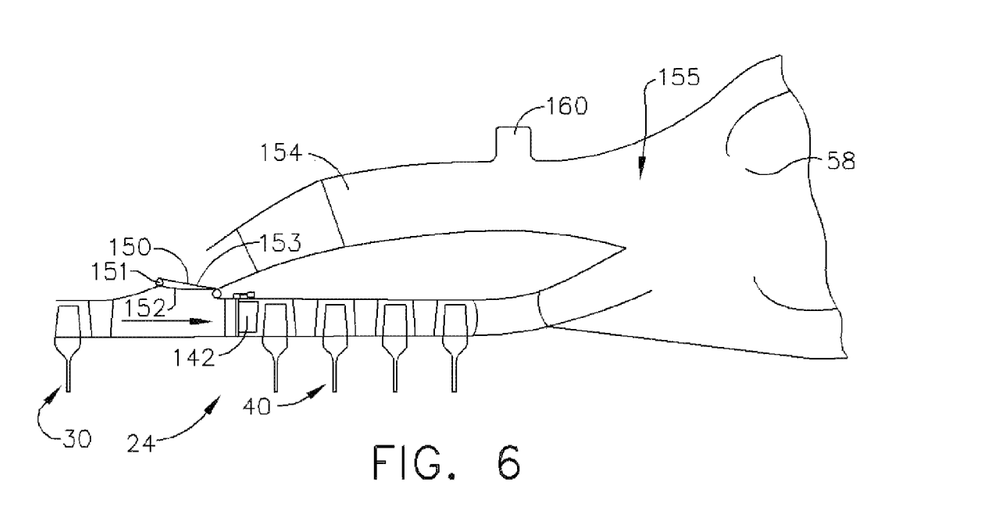
FIG. 6 is a schematic cross-sectional view of the compressor shown in FIG. 4 with a blocker door closed.

As described previously herein, FIGS. 2 and 3 show the general operating characteristics of an adaptive core engine according to the present invention. A high-power mode is characterized by the front block (FB) 30 of the core compressor 24 pressurizing the flow with the rear block (RB) 40 operating in a substantially closed manner. A low-power mode is characterized by the front block 30 operating well below its potential but with the rear block 40 operating at its maximum potential. As used herein, the terms "front-block" and "forward block" are used interchangeably to refer to the front block compressor (shown as item 30 in FIG. 1) located axially forward from the rear block compressor 40. FIG. 4 shows a notional schematic cross-section layout of a portion of the core compressor 24 region for an adaptive core engine, such as, for example, shown as item 10 in FIG. 1. FIG. 4 shows in superposition fashion the high and low power modes of operation. Transitions between the high-power and low-power modes of operation are made by operating a blocker door 150 to bypass some of the flow from the front block compressor 30 around the rear block compressor 40 through a bypass passage 154. It may be noted that variable stators are used to control the flow in the rear block compressor 40 and the bypass door (blocker door) 150 prevents backflow in the bypass passage 154 in certain operating conditions. In one exemplary design, the blocker door 150 has a hinge 151 and the blocker door 150 is capable of swinging about the hinge 151 to open or close the door 150. The blocker door 150 can be operated using known actuators. The FIG. 5 shows the same schematic cross-section layout of the core compressor 24 shown in FIG. 4, but only the high-power mode of operation is depicted, wherein the blocker door 150 is open and flow enters the bypass passage 154. FIG. 6 shows the low-power mode of operation where the blocker door 150 is closed to prevent reverse flow in the bypass passage 154 and the flow from the front block compressor 30 enters the rear block compressor 40. In both figures, only the rear stage of the front block (FB) 30 of the compressor is shown. As used herein, the terms "stator" and "vane" are used interchangeably to refer to the stator components such as compressor vanes and inlet guide vanes, such as, for example shown as items 38, 132, 134, 142 in FIG. 1 and similar items in other figures herein.

In operational mode shown in FIG. 5, the front block stators 132 (see FIG. 1) are nominal while the rear block stators 142, 48 are substantially closed. Only a small amount of airflow (see item 122 in FIG. 1), enough to purge the flow cavities, is allowed through the rear block 40. Furthermore, the bypass doors 150 are fully opened. In high power mode the front block 30 is operating at its maximum potential in both airflow and pressure ratio.

In FIG. 6, the front block vanes 38, 134 are in a more closed position to reduce the front block inlet corrected flow while maintaining the corrected speed at or near its (front block compressor) design level. The high spool speed is maintained to facilitate design of the rear block 40 that occurs when the core engine is in the low-power mode. In the low-power mode (see FIG. 6) the rear block stators 142 are set to their substantially opened position and the bypass doors 150 are substantially fully closed. The rear block 40 swallows substantially all the low power mode front compression block flow. Because the front block stators 38, 134 are more closed in this mode of operation, the physical flow swallowed by the rear block 40 is reduced from the flow level that bypasses the rear block 40 in the high power mode. However, because the pressure ratio of the front block 30 is reduced by the more closure of the front bloc, the discharge corrected flow from the front block 30 remains approximately constant as determined by a downstream throttle area. The rear block 40 has a design pressure ratio sufficient to return the core compressor 24 exit pressure to the selected level of high power mode cycle-overall-pressure ratio in the low power mode. The front or forward side 152 of the bypass doors 150 is at a pressure dictated by the pressure level and the Mach number from the exit of the front block 30. Also, the pressure level on the backside 153 of the bypass doors 150 is set by the static pressure at the mixing plane 155 since there is no flow to sustain a pressure difference in the bypass duct 154. In some operating conditions, significant pressure difference may exist across the doors 150 in a direction that forces the doors closed (see FIG. 6 for example).

Figure 7:
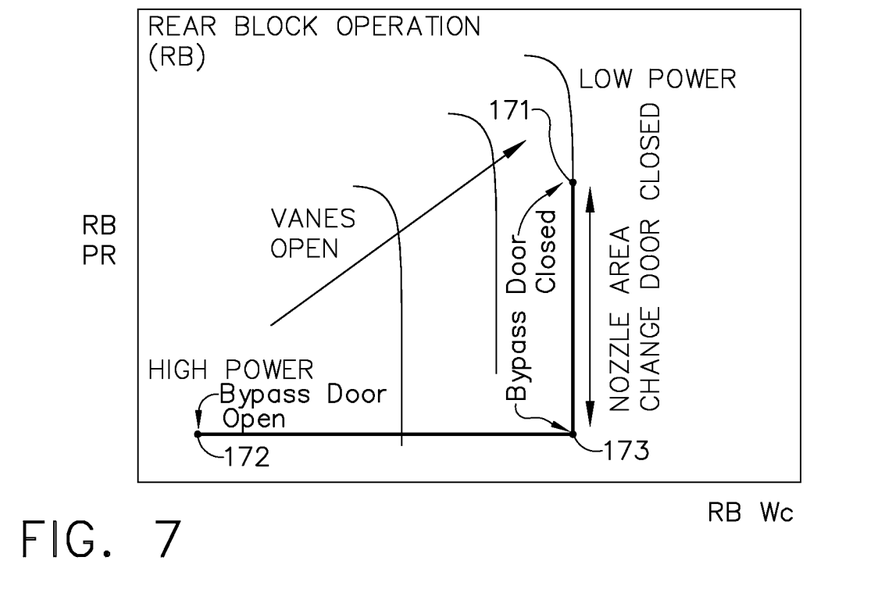
FIG. 7 is an example of a rear block compressor operating characteristic of the exemplary adaptive core gas turbine engine shown in FIG. 1.
Figure 8:
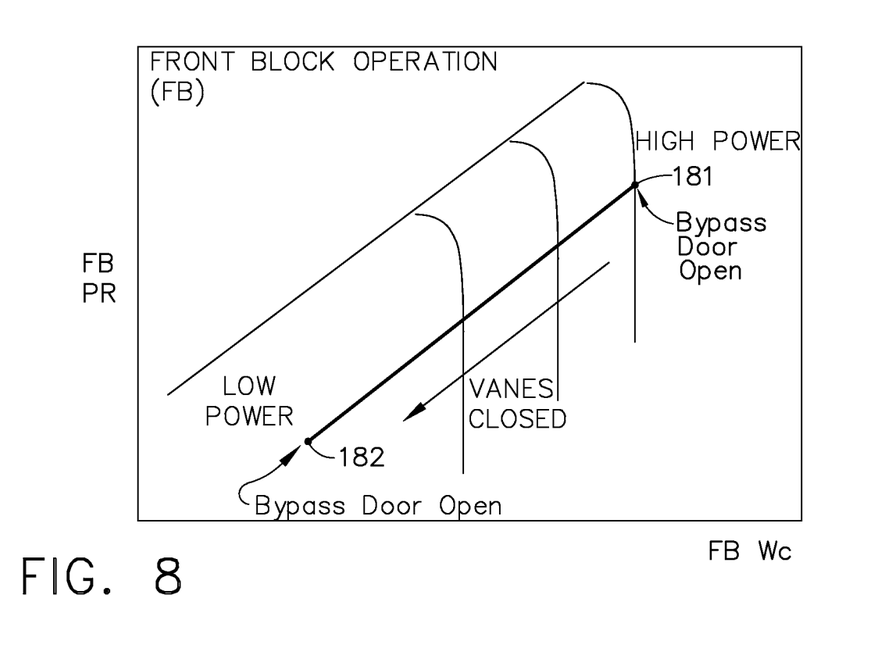
FIG. 8 is an example of a front block compressor operating characteristic of the exemplary adaptive core gas turbine engine shown in FIG. 1.

An exemplary method of operating an adaptive core engine (such as shown in the figures herein and described herein) is described below, referring to FIGS. 7 and 8. FIG. 7 shows an exemplary operating characteristics of the rear block compressor 40, having rear block corrected flow (RB Wc %) along the horizontal axis and the rear block pressure ratio (RB PR) along the vertical axis. FIG. 8 shows an exemplary operating characteristics of the front block compressor 30, having front block corrected flow (FB Wc %) along the horizontal axis and the front block pressure ratio (FB PR) along the vertical axis. Assuming initial operation in the high-power mode, (see operating points shown by item 172 in FIG. 7 and item 181 in FIG. 8) the front block 30 operates at the high-power mode (item 181, FIG. 8) and the front block stators 132, 134, 38 (see FIG. 1) are substantially open. Operating point shown as item 181 in FIG. 8 represents maximum power operation in the high thrust mode. This is when the engine is in the single bypass mode. The transition from the single bypass mode to the double bypass mode on the front fan is accompanied by moving the front block compressor 30 from operating point 181 to operating point 182. The stators (vanes 38, 132) on the front block 30 have been closed somewhat but the blocker door (bypass door) 150 remains in the open position. During this portion of the throttle hook the rear block 40 operates at point 172 (see FIG. 7) and, as noted, the bypass door 150 remains open. The stators 142, 48 on the rear block compressor 40 remain fully closed. Now, as the transition initiates, the rear block stators 142, 48 open until all of the flow coming from the front block 30 is passing through the rear block 40 and therefore the bypass flow in bypass passage 154 has been reduced to almost zero. Now the bypass door 150 can be closed. The rear block 40 is now operating at a point 173 (see FIG. 7) that is at nearly the same pressure ratio as point 172 but has the flow nearly the same as point 171. Then, the downstream flow function is reduced (such as, for example, by closing a downstream turbine nozzle 63, 65 area or exhaust nozzle 80 area) which causes the operating line on the rear block to raise to point 171. The bypass passage flow decreases as the rear block stators 142, 48 are opened from point 172 to 173 (see FIG. 7). Point 172 and point 173 collapse into one operating point 272 (FIG. 3) on the overall compressor map illustrated in FIG. 3. As described before, in the high-power mode, the rear block stators 142 (see FIG. 5) are substantially closed, except to allow purge flow 122. To transition the operation of the engine from this high-power mode to a low-power mode, the rear block stators 142 are slowly opened to increase flow in the rear block 40. When the amount of flow bypassing the rear block 40 reaches substantially zero, the bypass doors 150 are closed (see FIG. 6). During this process, the downstream variable area turbine nozzle 64 (see FIG. 1) is kept substantially fixed to maintain the rear block pressure ratio near unity.

Once the bypass doors 150 are closed, rear block recirculation is prevented and the downstream nozzle 62 (see FIG. 1) area can be reduced to increase rear block 40 pressure ratio. A combination of HP (high pressure turbine system) flow function, LP (low pressure turbine system) flow function and exhaust nozzle 80 area "A8" may be used to reduce the flow function and increase the rear block 40 pressure ratio. Overall core compressor 24 pressure ratio can be maintained at the high-power design level by partially closing the front block 30 stators to reduce front block pressure ratio in proportion to the increase in rear block 40 pressure ratio. It should be noted that partial closure of the front block stator 134, 38 has been achieved before transition of the rear block 40 is initiated and no further adjustment may be needed to front block stators 134, 38 until the aircraft requires a further reduction in thrust. When the front block stators 134, 38 and rear block stators 142, 48 reach their final low-power mode position, the rear block exit flow function is reduced to produce the elevated pressure ratio required of the rear block, and then transition from the high-power mode to the lower-power mode is complete. See FIGS. 7 and 8 which show the operating maps for the Rear Block 40 and the Front Block 30 respectively. It should be noted that in the operations of the variable vanes/stators for the front and rear block compressors described herein, more than just the IGV (Inlet Guide Vane) operation may be involved. In addition to the IGV, one or more vane row in each compressor block may be variable wherein all of them move in unison. In FIGS. 7 & 8 the speed lines are constant and the setting (stagger) on the vanes is varied.

A safety valve 160 is shown schematically in FIGS. 4, 5 and 6. The safety valve 160 would be employed, if for some reason, difficulty were encountered in proper control of the compressor operating line and hence the combustor 58 inlet pressure. To control the inlet pressure of the combustor 58, the safety valve 160 is opened to enable some of the flow to be extracted from the bypass passage 154. In the event that the valve 160 is opened, the flow through it would be discharged into a fan bypass duct and the operating line on the compressor(s) would drop. Opening valve 160 in effect increases the compressor downstream flow function.

In the maximum thrust mode, the adaptive core engine 10 typically operates in the single and/or double bypass fan mode. As reduced thrust is demanded, the combustor exit gas temperature ("T4") drops as engine exhaust nozzle 80 area ("A8") is opened. The core compressor corrected flow is dropping while this is happening and the front block stators 38, 132 are being adjusted according to their schedule. The core compressor 24 operation is still in the high-power mode but at a reduced thrust level. Further reduction in thrust causes a fan transition into the double bypass mode of operation. Further reduction in temperature "T4" accompanies the transition. During this time, the core compressor corrected flow is dropping with stator change while retaining high core compressor speed. The engine 10 is still in the high-thrust core mode but temperature T4 has been reduced and the stators 38, 132 on the core compressor front block 30 have been partially closed as prescribed by the stator schedule. At this point it is possible to start the transition of the core compressor 24 from its high power mode (in which the rear block compressor 40 is bypassed) to the low-power mode wherein the rear block 40 is operated at its full potential and the inner bypass flow in bypass passage 154 is reduced to zero.

In summary, an exemplary method of operating a gas turbine engine according to the present invention is described as follows: The method comprises the steps of (1) operating a front block compressor 30 to increase pressure of a fluid to a first pressure ratio in a high-power mode operation (see item 204 in FIG. 2); (2) operating a rear block compressor 40 coupled to the front block compressor 30 (see FIG. 1) such that the front block compressor 30 and the rear block compressor 40 operate at the same physical speed; (3) closing a rear block stator vane 142, 48 (see FIGS. 1, 4-6) such that the flow of the fluid into the rear block compressor 40 is substantially cut off except for a purge flow (see item 122 in FIG. 1) during the high-power mode operation; and (4) keeping the blocker door 150 (see FIGS. 4-6) opened such that substantially all of the fluid pressurized by the front block compressor 30 flows thorough a bypass passage 154 during the high-power mode operation. During this operation, the stator vanes 132, 134, 38 may be kept scheduled to hold corrected speed nearly constant. When the gas turbine engine is operating in a high-power mode, certain steps may be taken to transition the engine operation from the high-power mode to a low-power mode. The step of partially closing a front block stator vane 132, 134, 38 may be taken in preparation for the transition. Then the step of opening the rear block vanes 142, 48 is taken such that the rear block compressor 40 receives at least a portion of the fluid flowing from the front block compressor 30. During this step, the rear block stator vane 142, 48 will be opened. The above steps are carefully performed and the blocker door is operated to a closed position such that there is no reversal of flow in the bypass passage 154 or there is no recirculation of flow in the rear block compressor 40. Further, the flow functions downstream from the core compressor is adjusted using, for example, variable turbine nozzle vanes 62, 65 and/or exhaust nozzle 80, such that the rear block compressor 40 operating line is raised and increases the pressure to a second pressure in the low-power mode.

In the exemplary method of transitioning the engine operation from high-power mode to a low-power mode, the blocker door 150 and the rear block stator vanes 142, 48 are operated such that an overall pressure ratio in the low-power mode after transition is substantially the same as the overall pressure ratio in the high-power mode before the transition. It may be noted that in preparation for transition to low-power mode of the rear block 40, the core has pulled away from its maximum potential pressure ratio operation (P2, for example in FIG. 2). During this initial phase, the core flow is reduced (such as for example, partially closing the front block stator vanes 132, 38), as well as its pressure ratio is reduced (see point identified by item number 182 in FIG. 8). The operating point where transition to the "low-power" mode for the rear block 40 is initiated is point 182 on FIG. 8. During the transition operation from high-power mode to a low-power mode for the rear block compressor, the variable area turbine nozzle 64 (see FIG. 1) is maintained in a substantially fixed position. Once the transition to low-power mode is complete and the blocker door 150 is substantially closed, the rear block pressure ratio may be increased by taking the step of reducing the flow function down stream from the compressor, such as, for example, reducing an area of an variable turbine nozzle 64, 65 located downstream from the rear block compressor. When the transition of the core compressor 24 from the high-power mode to the low-power mode is complete, the front block 30 will be operating at a point that is less than it maximum design capability whereas the rear block 40 will be operating at its maximum design capability. The adaptable core feature and the method of operation as described herein overcome the loss in overall pressure ratio accompanying part power operation in conventional engines. As explained before, if needed in order to control the pressure of fluid entering the combustor, the method may involve the additional step of opening a safety valve 160 to release a portion of the flow in the bypass passage 154 into another location.

The description of the exemplary transition process as employed herein initiates with the engine in the high-power mode and terminates with the engine in the low-power mode. The reverse transition process wherein the engine initiates transition from the low-power mode and terminates with the engine in the high-pressure mode can also be accomplished similarly. The steps in this reverse transition process simply mirror the steps described herein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features. The detailed descriptions and illustrations herein of embodiments of the present invention are by way of example and not by way of limitation.

What is claimed is:

1. A method of operating a compressor comprising the steps of:
 operating a front block compressor of an adaptive core engine to increase pressure of a fluid to a first pressure ratio in a high-power mode operation;
 operating a rear block compressor of the adaptive core engine coupled to the front block compressor such that the front block compressor and the rear block compressor operate at the same physical speed;
 driving the front and rear block compressors with a high pressure turbine;
 closing a rear block stator vane such that flow of the fluid into the rear block compressor is substantially cut off except for a purge flow during a high-power mode operation;
 keeping a blocker door opened such that substantially all of the fluid pressurized by the front block compressor flows through a bypass passage during the high-power mode operation; and
 flowing all of the fluid from the front and the rear block compressors into a combustor of the adaptive core engine upstream of a high pressure turbine of the adaptive core engine.

2. A method according to claim 1 further comprising the step of keeping a front block compressor stator vane substantially open.

3. A method according to claim 2 wherein the front block compressor stator vanes are scheduled to keep a front block corrected speed of the front block nearly constant.

4. A method according to claim 1 further comprising a step of transitioning the rear block compressor operation from the high-power mode to a low-power mode by opening a rear block stator vane such that the rear block compressor receives at least a portion of the fluid flowing from the front block compressor.

5. A method according to claim 4 wherein the step of transitioning includes substantially closing the blocker door.

6. A method according to claim 5 wherein the blocker door is operated to a closed position such that there is no reversal of flow in a bypass passage.

7. A method according to claim 3 wherein the blocker door is operated to a closed position such that there is no recirculation of flow in the rear block compressor.

8. A method according to claim 5 wherein the blocker door, rear block stator vane and front block stator vane are operated such that an overall pressure ratio in the low-power mode after transition is substantially the same as an overall pressure ratio in the high-power mode before the transition.

9. A method according to claim 4 wherein a variable area turbine nozzle is maintained in a substantially fixed position during the transition from high-power mode to a low-power mode.

10. A method according to claim 5 further comprising a step of reducing an area of a variable area high pressure turbine nozzle located downstream from the rear block compressor, thereby increasing a rear block pressure ratio.

11. A method according to claim 5 further comprising a step of reducing an area of a variable area low pressure turbine nozzle located downstream from the rear block compressor, thereby increasing a rear block pressure ratio.

12. A method according to claim 5 further comprising a step of reducing an area of an exhaust nozzle located downstream from the rear block compressor, thereby increasing a rear block pressure ratio.

13. A method according to claim 1 further comprising a step of opening a safety valve to release a portion of the flow in the bypass passage.

* * * * *